United States Patent
Turner

(10) Patent No.: US 7,130,449 B2
(45) Date of Patent: Oct. 31, 2006

(54) METHOD AND SYSTEM FOR GROUND IMAGING

(75) Inventor: Robert W. Turner, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 774 days.

(21) Appl. No.: 10/329,114

(22) Filed: Dec. 23, 2002

(65) Prior Publication Data
US 2004/0120551 A1    Jun. 24, 2004

(51) Int. Cl.
G06K 9/00 (2006.01)
G01S 13/00 (2006.01)
G01S 13/08 (2006.01)

(52) U.S. Cl. .............. 382/109; 342/65; 342/123; 342/140

(58) Field of Classification Search .......... 382/109; 342/140, 123, 65; 367/9, 14
See application file for complete search history.

(56) References Cited

U.S. PATENT DOCUMENTS

| | | | |
|---|---|---|---|
| 3,017,512 A | | 1/1962 | Wolbert |
| 3,783,294 A | | 1/1974 | Koper |
| 4,554,543 A | * | 11/1985 | Wyatt et al. ............... 340/948 |
| 4,862,047 A | * | 8/1989 | Suzuki et al. ............... 318/587 |
| 5,091,647 A | | 2/1992 | Carduner et al. |
| 5,862,325 A | | 1/1999 | Reed et al. |
| 6,184,528 B1 | | 2/2001 | DiMarzio et al. |
| 6,593,875 B1 | * | 7/2003 | Bergin et al. ............... 342/121 |

FOREIGN PATENT DOCUMENTS

FR    2 680 240    8/1991

WO    WO 2004/048888    11/2003

OTHER PUBLICATIONS

Standard Guide for Preparation of Aluminum Surfaces for Structural Adhesives Bonding (Phosphoric Acid Anodizing), ASTM International Designation: D 3933-98, Copyright 2003, pp. 3-4, American Society for Testing and Materials, 100 Barr Harbor Dr., West Conshohocken, PA 19428.

Pavlovic et al., Optical and Microstructural Properties of Anodically Oxidized Aluminum, Elsevier Sequoia, Thin Solid Films, 138, pp. 97-109, 1986.

Laet, et al., Development of an Optical Model for Steady State Porous Anodic films on Aluminum Formed in Phosphoric Acid, Elsevier Science S.A., Think Solid Films, 320, pp. 241-252, 1998.

Anicai, L., Analysis of Electrochemical Colored Aluminum Anodic Films in AgNo3-Based Electrolytes by Diffuse Reflectance Spectra, Elsevier Science, Inc., Metal Finishing, pp. 10-13, 1998.

* cited by examiner

Primary Examiner—Jingge Wu
Assistant Examiner—Shefali Patel
(74) Attorney, Agent, or Firm—Lee & Hayes, PLLC

(57) ABSTRACT

A system and method for determining the slope of a ground imaged area. The system includes a camera, a memory, and a processor. The camera generates a first and a second image of an area of ground from an aircraft. The memory stores bi-directional characteristic information for associated materials. The processor determines a material type associated with a plurality of the pixels based on a color value of the pixels. The processor retrieves bi-directional characteristic information from the memory for a pixel based on the determined material type. A slope value at a pixel location is determined based on the associated viewing angle values, a determined radiance change value, and the retrieved bi-directional characteristic information.

8 Claims, 5 Drawing Sheets

METHOD AND SYSTEM FOR GROUND IMAGING

FIELD OF THE INVENTION

This invention relates generally to image generation and, more specifically, to aerial-based three-dimensional imaging of the ground.

BACKGROUND OF THE INVENTION

In the fields of precision management of crop irrigation, city planning, military operations, etc., aerial ground mapping is an important aspect to these and other applications. Laser Imaging Detecting and Ranging (LIDAR) systems are presently used to determine absolute elevation of the ground for generating digital elevation maps. LIDAR systems are very expensive and require costly processing in order to generate a detailed elevation map. Another approach is to use a digital elevation mapping technique that uses stereoscopic techniques in order to generate an elevation map. Stereoscopic techniques require extensive manual calculations or very expensive advanced digital processing equipment for processing a very large amount of data.

Therefore, there exists a need for a less expensive, fast, and accurate system and method for generating elevation maps.

SUMMARY OF THE INVENTION

The present invention is a system for determining the slope of a ground imaged area. The system includes a camera, a memory, and a processor. The camera generates a first and a second image of an area of ground from an aircraft. The memory stores bi-directional characteristic information for associated materials. The processor is coupled to the camera and the memory. The processor determines a material type associated with a plurality of the pixels based on a color value of the pixels. The processor retrieves bi-directional characteristic information from the memory for a pixel based on the determined material type. A radiance change value is determined for at least one pixel location by subtracting a radiance value at a pixel location in the first image to a radiance value at the same pixel location in the second image. A slope value at a pixel location is determined based on the associated viewing angle values, the determined radiance change value, one of the radiance values from the images, and the retrieved bi-directional characteristic information.

Also, the processor generates an elevation map based on the determined slopes.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
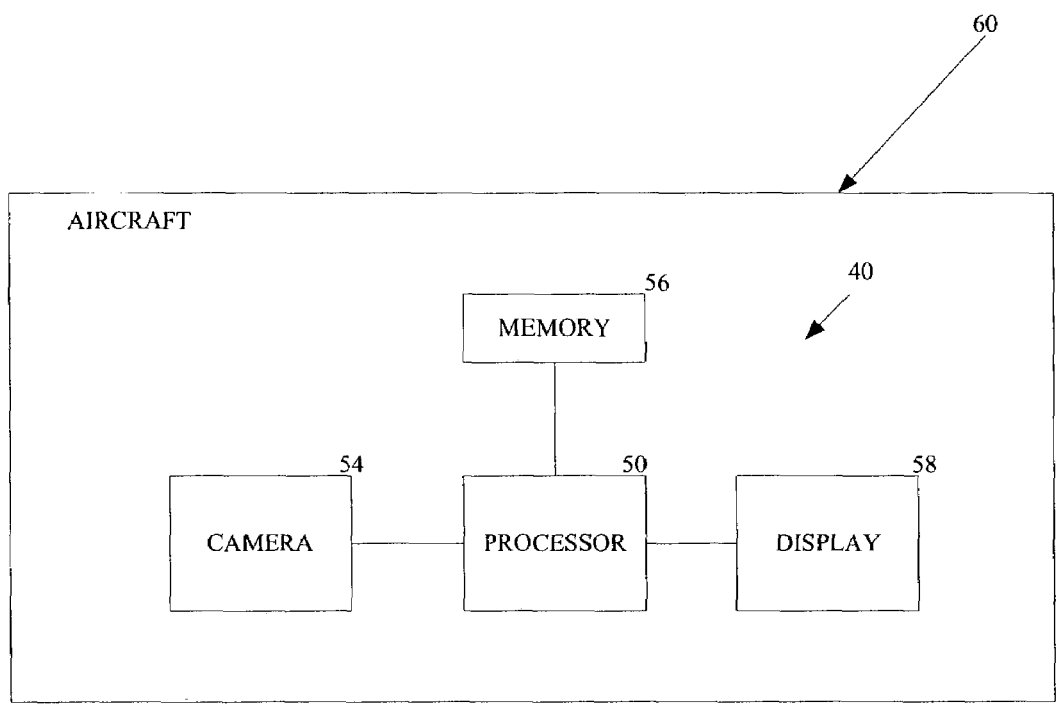
FIG. 1 is a block diagram of an example system of the present invention.

FIG. 1 illustrates an exemplary system 40 that generates a three-dimensional map image according to the present invention. The system 40 includes a processor 50 coupled to one or more cameras 54, a memory 56, and a display 58. The system 40 is located in an aerial platform, such as without limitation an aircraft 60.

As the aircraft 60 is flying over an area of terrain that is to be turned into a three-dimensional digital elevation map, a processor 50 receives a first image generated by the camera 54 at a first time and second image generated by the camera 54 at a next time after a predetermined period of time from the first time. The camera 54 is suitably a radiometric-framing camera. The processor 50 compares the two received images and determines a material associated with corresponding pixels in the two images. For each pixel, the processor 50 retrieves a bi-directional characteristic from the memory 56 based on the determined associated material. Then, the processor 50 determines the slope for each pixel (or sample point) based on a first determined viewing angle for the pixel in the first image, a second determined viewing angle for the pixel in the second image, and the bi-directional characteristic information retrieved for the associated pixel. The processor 50 stores the determined slope values for each of the pixels in the memory 56 or uses the determined slope values for each of the pixels to generate a three-dimensional image or elevation map. The image/map is sent to the display 58 for presentation.

Figure 2A:
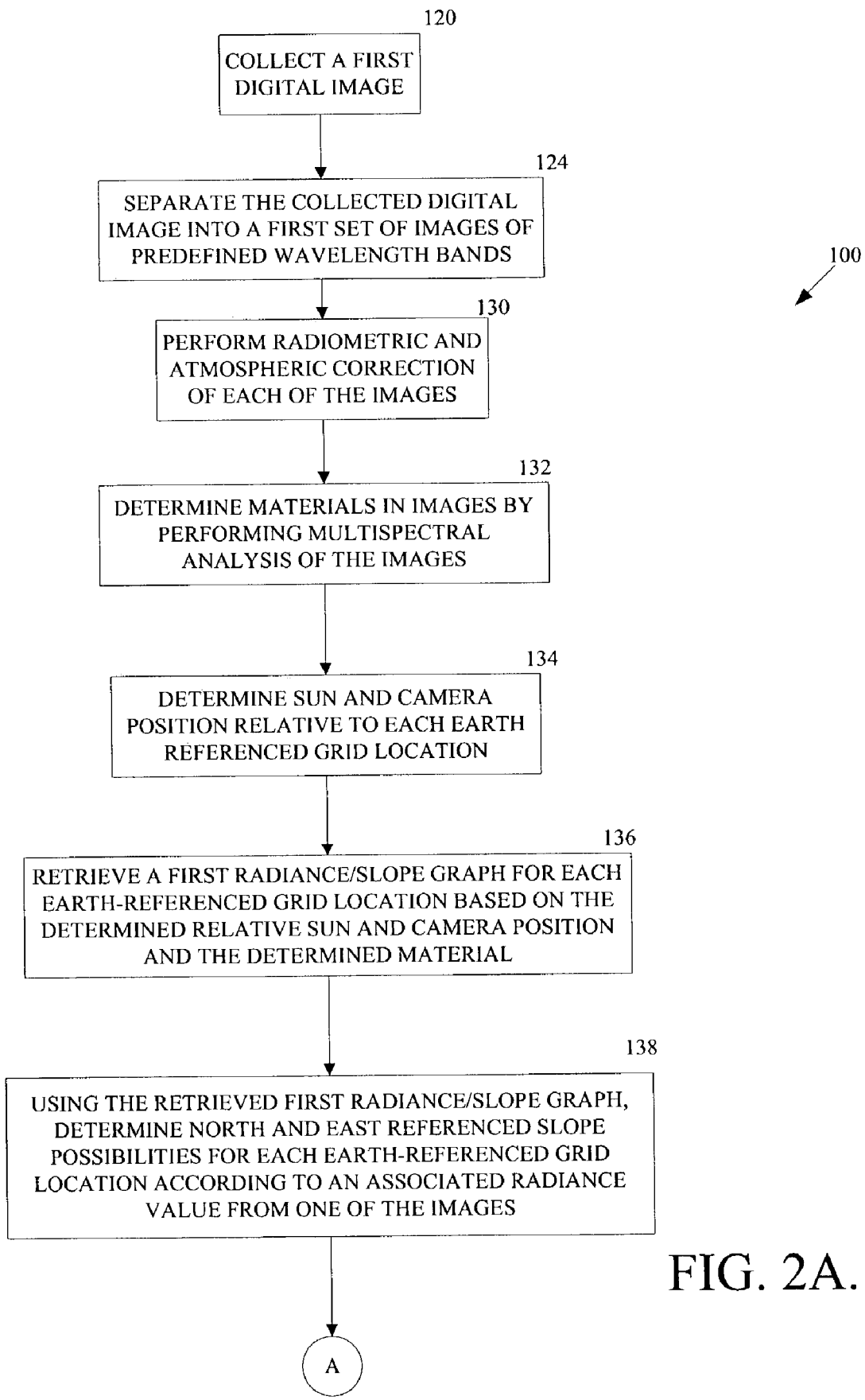
FIGS. 2A–C illustrate a flow diagram performed by the system shown in FIG. 1.
Figure 2B:
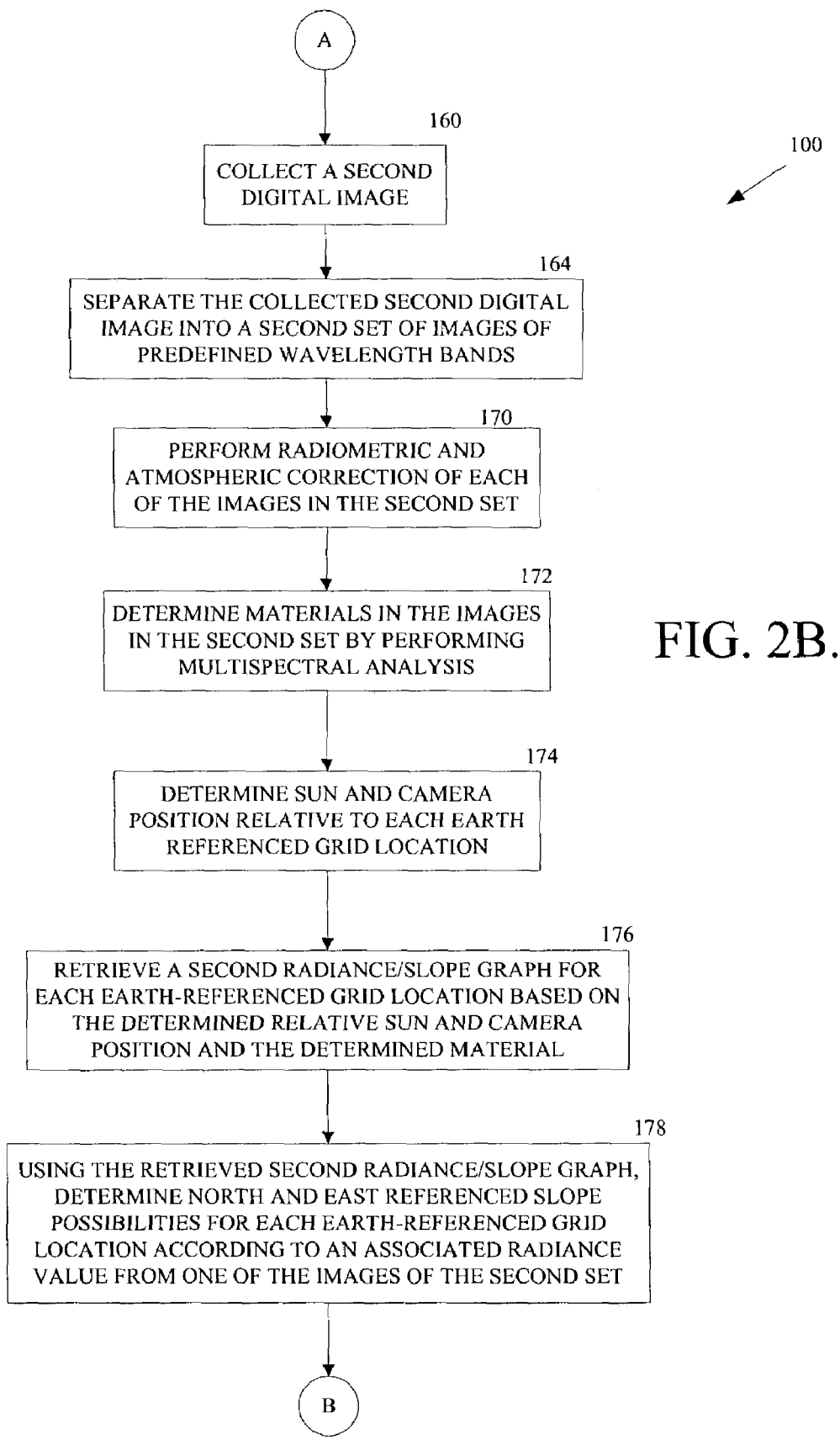
Figure 2C:
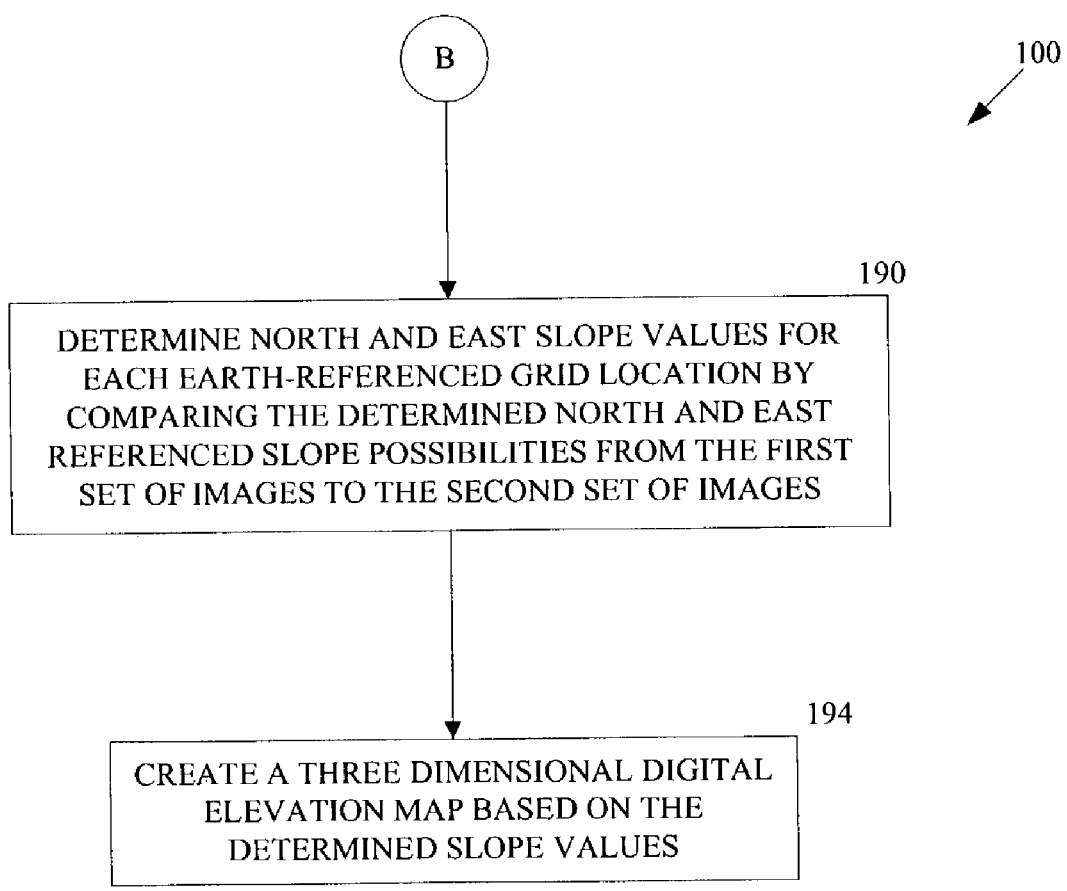

FIGS. 2A–C illustrate an exemplary process 100 performed by the system 40 shown in FIG. 1. At a block 120, a first digital image is collected by the processor 50 from the camera 54. At a block 124, the collected first digital image is separated into a first set of images of predefined wavelength bands. At a block 130, the processor 50 performs radiometric or atmospheric corrections of each of the images in the first set, as necessary. This step corrects for weather conditions and other anomalies.

Figure 3:
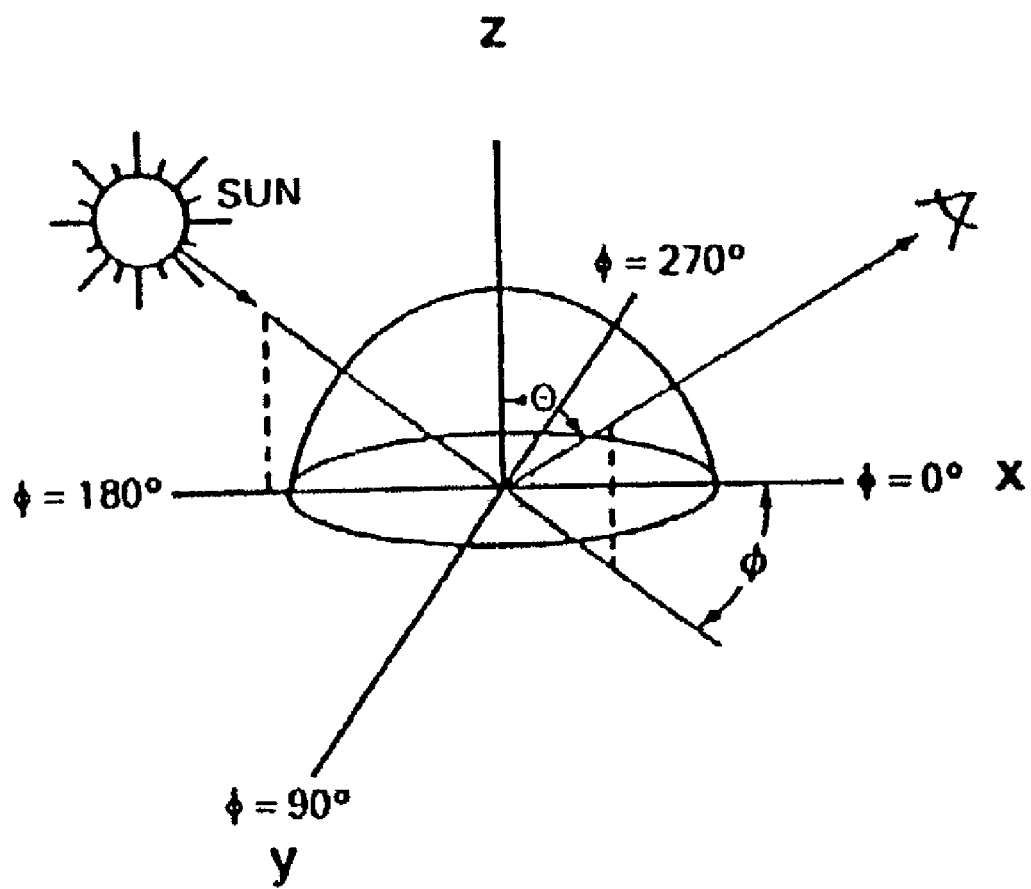
FIG. 3 is a global view of geometric relationships.

At a block 132, each pixel in each image is matched with a material, such as without limitation corn, grass, soil, asphalt or building materials, by performing multispectral analysis of each pixel. For example, if image information for a pixel is within the green bandwidth of light, the material is grass. Each pixel represents an area on the ground. At a block 134, sun and camera positions (elevation angle and azimuth) relative to the area of ground represented by each pixel are determined (see FIG. 3).

At a block 136, a first radiance/slope graph for each pixel is retrieved based on the determined relative sun and camera positions and the matched material. Radiance/slope graphs are suitably stored in the memory 56. At a block 138, using the retrieved first radiance/slope graph, north and east-referenced slope possibilities for each pixel in one of the images in the first set are determined according to a radiance value of that pixel.

As shown in FIG. 2B, a second digital image is collected after a sampling period of time from the first image by the processor 50 from the camera 54, at a block 160. Like the first collected digital image at block 120, the second collected digital image is separated into a second set of images of predefined wavelength bands, at a block 164. At a block 170, the processor 50 performs radiometric or atmospheric corrections of each of the images in the second set of images, as necessary. At a block 172, each pixel in each of the second set of images is matched with a material by performing multispectral analysis of each pixel. At a block 174, sun and camera positions relative to the area of ground represented by each pixel are determined.

At a block 176, a second radiance/slope graph for each pixel is retrieved based on the determined relative sun and camera positions and the matched material. At a block 178, using the retrieved second radiance/slope graph, north and east-referenced slope possibilities for each pixel in one of the images in the second set are determined according to a radiance value from that pixel.

As shown in FIG. 2C, at a block 190, north and east slope values for each area of ground represented by a pixel in an image of the first set and a pixel in an image of the second set are determined by comparing the determined north and east-referenced slope possibilities from the block 138 to the north and east-referenced slope possibilities from the block 178. The determined north and east slope values identify the orientation of the area of ground represented by the pixels. At a block 194, a three-dimensional digital elevation (contour) map is created based on the determined north and east slope values. It can be appreciated that the north and east slope values can be determined other ways, such as by using a difference in radiance between corresponding pixels in the first and second set of images, or by methods of searching the second slope possibilities with the first slope possibilities.

In order to create an elevation map, the processor 50 determines the scale of each pixel based on low resolution digital elevation data and GPS information. The processor 50 also determines the rise for a pixel based on the size of the pixel in the image. The processor 50 multiplies the slope values for each pixel by a matrix of pixel size at each position. Finally, the processor 50 creates the three-dimensional digital elevation map by summing the product matrix values along a path parallel to the flight path.

In order to generate a map referenced to global elevation, an elevation reference point is applied to the map creation step.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A method for determining the slope of a ground imaged area, the method comprising:
    generating a first and a second image of an area of ground from an aircraft, wherein the first and second images with pixels correlate to the area of the ground that are images taken at different times and wherein each pixel in the first and second images includes a viewing angle value;
    determining a material associated with a plurality of the pixels;
    retrieving a bi-directional characteristic information based on the determined material;
    determining a radiance change value for at least one pixel of the first and second images by subtracting a radiance value at a pixel location in the first image to a radiance value at the same pixel location in the second image; and
    determining a slope at a pixel location based on the associated viewing angle values, the determined radiance change value, one of radiance values of the first or second images, and the retrieved bi-directional characteristic information.

2. The method of claim 1, further comprising generating an elevation map based on the determined slopes.

3. A system for determining the slope of a ground imaged area, the system comprising:
    a camera configured to generate a first and a second image of an area of ground from an aircraft, wherein the first and second images include pixels that correlate to the area of the ground at different moments of time and wherein each pixel in the first and second images includes a viewing angle value;
    a memory configured to store material information and associated bi-directional characteristic information; and
    a processor coupled to the camera and the memory, the processor including:
        a first component configured to determine a material associated with one or more of the pixels;
        a second component configured to retrieve bi-directional characteristic information for a pixel based on the determined material;
        a third component configured to determine a radiance change value for at least one pixel location by subtracting a radiance value at a pixel location in the first image to a radiance value at the same pixel location in the second image; and
        a fourth component configured to determine a slope at a pixel location based on the associated viewing angle values, the determined radiance change value, one of the radiance values of the first of second images, and the retrieved bi-directional characteristic information.

4. The system of claim 3, wherein the processor further comprises a fourth component configured to generate an elevation map based on the determined slopes.

5. The system of claim 3, wherein the first component is configured to determine a material associated with one or more of the pixels based on a color value of the one or more pixels.

6. The system of claim 3, wherein the system is implemented in an aircraft.

7. A system for determining the slope of a ground imaged area, the system comprising:
    a camera configured to generate a first and a second image of an area of ground from an aircraft, wherein the first and second images include pixels that correlate to the area of the ground at different moments of time and wherein each pixel in the first and second images includes a viewing angle value;
    a memory configured to store material information and associated bi-directional characteristic information; and
    a processor coupled to the camera and the memory, the processor including:
        a first component configured to determine a material associated with one or more of the pixels;
        a second component configured to retrieve bi-directional characteristic information for a pixel based on the determined material;
        a third component configured to determine a radiance change value for at least one pixel location by subtracting a radiance value at a pixel location in the first image to a radiance value at the same pixel location in the second image; and
        a fourth component configured to determine a slope at a pixel location based on the associated viewing angle values, the determined radiance change value, one of the radiance values of the first of second images, and the retrieved bi-directional characteristic information.

8. A method for determining the slope of a ground imaged area, the method comprising:

generating a first and a second image of an area of ground from an aircraft, wherein the first and second images with pixels correlate to the area of the ground that are images taken at different times and wherein each pixel in the first and second images includes, a viewing angle value;

determining a material associated with a plurality of the pixels;

retrieving a bi-directional characteristic information based on the determined material;

determining radiance values for at least one pixel of the first and second images; and determining a slope at a pixel location based on the associated viewing angle values, the determined radiance values, and the retrieved bi-directional characteristic information.

\* \* \* \* \*